Aug. 7, 1945.  F. BRYANT  2,381,644
APPARATUS FOR TRIMMING PIES AND THE LIKE
Filed Oct. 20, 1943  2 Sheets-Sheet 1
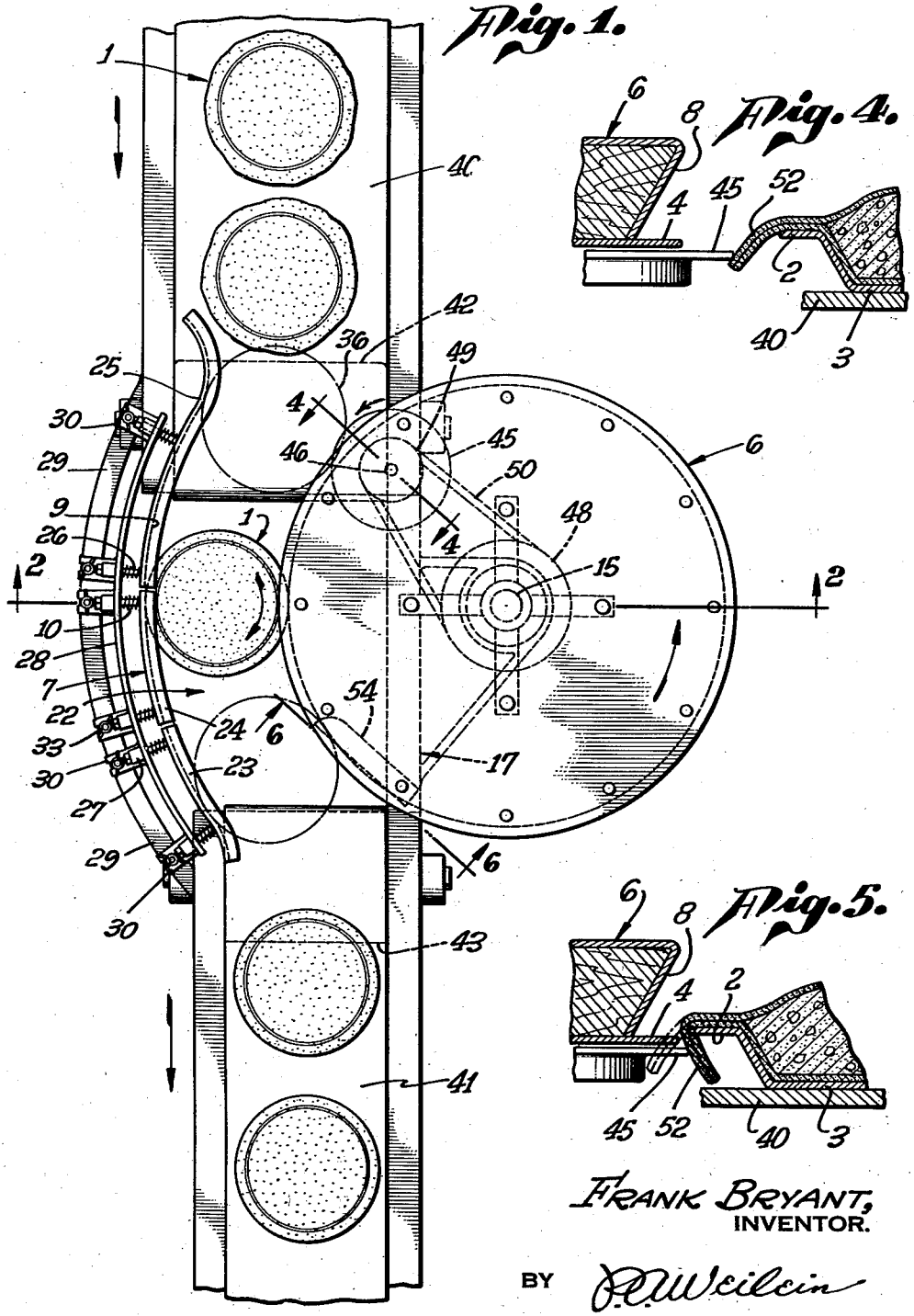
Frank Bryant,
INVENTOR.
BY [signature]
ATTORNEY.

Aug. 7, 1945.  F. BRYANT  2,381,644
APPARATUS FOR TRIMMING PIES AND THE LIKE
Filed Oct. 20, 1943  2 Sheets-Sheet 2
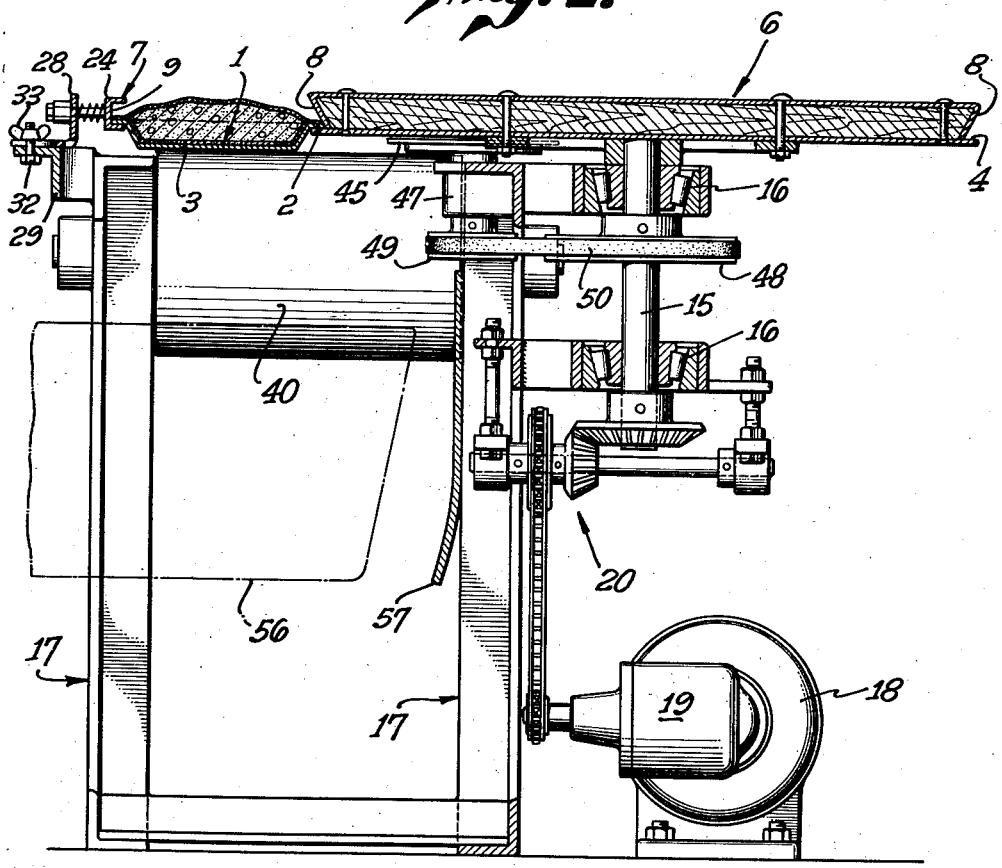
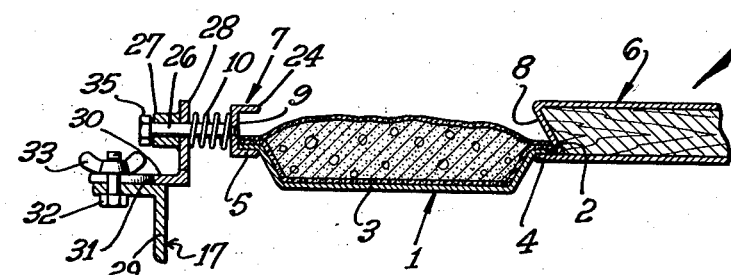
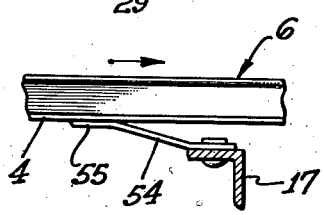
FRANK BRYANT, INVENTOR.

Patented Aug. 7, 1945

2,381,644

UNITED STATES PATENT OFFICE 2,381,644

APPARATUS FOR TRIMMING PIES AND THE LIKE

Frank Bryant, Los Angeles, Calif., assignor to Bradley Pie Company, Los Angeles, Calif., a copartnership consisting of Theodore T. Meehleis, R. H. Bradley, Jr., and Edith Bradley Application October 20, 1943, Serial No. 507,004

15 Claims. (Cl. 107—49)

This invention relates to apparatus for trimming pies.

As is well known in the bakery art, in the making of pies the dough forming the pie crust projects over the edge of the pie pan in an irregular manner and it is customary prior to baking, to trim such dough to conform with the edge of the pan to impart a pleasing and neat appearance to the pie when finished. This is often done by hand, particularly when pies are made in small quantities, although machines are commonly employed for the purpose where pies are made in large quantities.

It is an object of the present invention to provide an improved apparatus for trimming pies, particularly, where they are made in large quantities.

It is another object of this invention to provide such apparatus requiring a minimum of attention on the part of the operator.

It is another object of this invention to provide such apparatus capable of operating in a continuous manner.

It is another object of this invention to provide such apparatus operating as a conveyor or which is capable of forming a unit in a conveyor system wherein the untrimmed pies are fed to the apparatus at one point and delivered, trimmed, at another point by the apparatus.

It is another object of this invention to provide trimming apparatus wherein the article to be trimmed is given a rolling motion along a trimming surface whereby the entire periphery of the edge is brought progressively against said surface, and at the same time the article is given a translatory movement carrying it from the point of entry to the point of discharge.

It is still another object of this invention to provide apparatus of the character described in which the flange of the pie pan cooperates with a relatively moving member to produce a scissors like action for shearing or trimming any dough which may project beyond the edge of the pan.

It is still another object of this invention to provide apparatus of the character described including means operating to maintain the flange of the pie pan in proper trimming relation with the moving member.

It is still another object of this invention to provide apparatus of the character described including means operating to seal the upper and lower layers of pie crust dough together about the edge of the pie.

It is a still further object of this invention to provide, in connection with trimming apparatus of the character described, means for engaging any crust projecting beyond the edge of the pie pan and drawing it downwardly to facilitate the trimming operation.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 1 is a plan view of apparatus incorporating the invention;

Figure 2 is a cross section on an enlarged scale taken on line 2—2 of Figure 1;

Figure 3 is a fragmentary section similar to Figure 2, but on a further enlarged scale;

Figure 4 is a diagrammatic sectional view on an enlarged scale, taken on line 4—4 of Figure 1, showing the excess dough projecting beyond the edge of the pie pan about to be turned downwardly preparatory to the trimming operation;

Figure 5 is a similar view showing the excess dough turned downwardly and about to be trimmed from the edge of the pie pan; and Figure 6 is a fragmentary detail section taken on line 6—6 of Figure 1.

Referring to the drawings and particularly to Figure 3, a pie is shown in a conventional pie pan or plate indicated by the numeral 1, which includes an annular edge portion or flange 2 spaced above the bottom 3. The pie plate 1 is supported at diametrically opposite sides by resting on lips 4 and 5 disposed at opposite sides of the plate. One of these lips as 4 is formed on a moving member 6, the other lip 5 being on a stationary guide member 7. Furthermore, the members 6 and 7 have wall surfaces 8 and 9 respectively, extending upwardly from the lips 4 and 5, the wall surfaces engaging the edge or periphery of the flange 2 of the pie pan. The guide member 7 is supported for movement toward and away from the member 6, being urged toward the member 6 as by a number of suitable compression springs 10.

It is to be understood that the members 6 and 7 are generally horizontal, and that lips 4 and 5 are substantially in a common plane. Since the pie pan 1 is resiliently confined by its outer periphery between the walls 8 and 9 due to the resilience of the springs 10, movement of the member 6 in a horizontal direction will cause the pie plate 1 to have a rolling or planetary motion along the stationary member 7, as well as on the member 6. This causes the pie to be advanced between the members; and further, causes the edge of the flange 2 of the pie plate 1 to sweep over the lips 4 and 5. The pie crust dough which extends beyond the flange 2 for any considerable distance will hang more or less downwardly since such dough is quite limp and flexible. Thus, as the flange 2 advances toward the lip 4 of the moving member 6 such dough will be engaged between the lip and the flange. Then as the flange sweeps over the lip, the flange and the lip together have a scissors like or shearing action which severs the dough. The lip 4 may be formed of sufficiently thin plate material to have such cutting action without the necessity of providing it with a specially prepared edge.

The periphery of the crust is irregular so that the distance which it projects beyond the edge of the flange 2 is not the same at all points about the flange, and in some places the crust may not project over the flange at all. If the amount of projection is small, the crust, even though limp, may not hang down sufficiently to be properly engaged between the flange 2 and the lip 4. To insure proper trimming and especially when the projection is small, means to be presently described are provided for engaging the projecting crust and forcing it downwardly.

To insure the flange 2 remaining on the lip 4 during operation and to guard against its being lifted therefrom, as by the force of springs 10 or other causes, the wall surface 8 is inclined outwardly to overhang the lip 4 and provide a wedge shaped groove for receiving and confining the flange 2 against the lip 4. It will be apparent that the moving member 6 performs several functions. Thus, it trims the pie; it assists in supporting the pie pan during the trimming operation, and possibly thereafter; and it advances the pie toward the place of delivery.

Referring in more detail to the structure, reference being had additionally to Figures 1 and 2, the moving member 6 is shown as being circular and of relatively large diameter, and supported for rotation by being mounted on a vertical shaft 15 rotatably supported by anti-friction bearings 16 on a stationary frame 17. Shaft 15 is arranged to be driven by any convenient source of power, for example a motor 18, connected to the shaft 15 through a speed reducer 19 and appropriate transmission means 20.

As clearly shown in Figure 1, the guide member 7 is of arcuate form and generally concentric with the member 6 so as to provide a path 22 for the passage of the pies while trimming. To insure that the edges of the flanges 2 of the pie plates are maintained in proper contact with the cutter member 6, as well as to facilitate proper adjustment of the guide member 7, this member is made in a number of short sections as 23, 24 and 25. Each of these sections is supported for movement toward and away from the member 6 as by a pair of rods 26. Each rod 26 (see Figure 3) is slideably supported in a boss 27 formed on an arcuate bar 28, which in turn is mounted for adjustment toward and away from the member 6 on a bar 29 of the frame 17. The bar 28 is supported on the bar 29 by a number of feet or brackets 30 formed on the bar 28 and provided with slots 31 for the reception of clamping bolts 32 provided with wing nuts 33. Each rod 26 is encircled by one of the aforementioned springs 10, for urging the guide member 7 toward the cutting member 6, a nut 35 being provided on the end of each rod 26 to limit the movement in response to the spring 10. The outer ends of the guide member sections 23 and 25 may be reversely curved to facilitate the entry and exit of pies from the path 22.

It will be understood that a pie is placed in any convenient manner in about the position indicated by 36, so that it is supported by the flange 2 of the pan 1 resting on the lips 4 and 5. The member 6 is rotated in a counterclockwise direction and urges the pie between the walls 8 and 9 of the members 6 and 7 respectively. The periphery of the flange 2 is resiliently confined between the walls 8 and 9 by the springs 10. Due to the engagement of the edge of the flange 2 and the wall 8, the pie will be rotated in a clockwise direction and advanced in the path 22 in the direction in which the member 6 is rotating. To provide a suitable pressure on the pie plate as well as to accommodate different sizes of pans 1, the bar 28 may be appropriately adjusted by loosening the nuts 33, which are tightened after adjustment. Path 22 is of course of such length that a pie during its traverse of said path makes at least slightly more than a complete revolution, to insure trimming of the entire edge of the pie.

The pies are supported by the members 6 and 7 while being trimmed, but it is of course desirable and even necessary to provide support for the pies as they enter and leave the path 22. To facilitate operation of the apparatus and obtain the full benefit of its rapid action, it is preferable to provide endless belt conveyors 40 and 41 for respectively delivering the pies for trimming and removing them after trimming. In Figure 1, only that end of each conveyor 40 and 41 adjacent the trimming apparatus is shown, it being understood that the opposite ends are supported in any suitable manner. Thus, that end of the belt 40 which is shown, is carried on a pulley 42 so positioned as to insure that a pie is adequately supported by the members 6 and 7 before leaving the belt. Similarly, the belt 41 is carried by a pulley 43 so positioned that a pie is adequately supported on the belt before it moves off the lips 4 and 5.

For insuring proper trimming of any crust which may project beyond the edge of the flange by lip 4 and the flange 2 of the pie, a revolving disc 45 is provided immediately below the cutter 6, with its periphery projecting outwardly of the lip 4 at a place slightly in advance of that where a pie pan 1 first engages the cutter (see Figure 1). This disc 45 is mounted on a shaft 46 rotatably supported in a bearing 47 secured to the upper part of the frame 17, and is driven in the same direction as the cutter 6 and at a peripheral speed slightly in excess of that of the cutter in any convenient manner, as by pulleys 48 and 49 respectively on shafts 15 and 46, connected by a belt 50. The action of the disc 45 may be understood from a consideration of Figures 4 and 5 in connection with Figure 1. Figure 4 shows the pie pan 1 still supported by the conveyor 40 and just before the flange 2 engages the lip 4. As indicated in Figure 1, Figure 4 shows the pie at a point somewhat in advance of that at which the overhanging crust is first engaged by the disc 45, this overhanging portion being indicated by 52. Continued advance of the pie causes the pie pan 1 to move downwardly in Figure 1 and to the left in Figure 4, thus the projecting crust 52 will engage the periphery of the disc 45, the movement of which will pull the crust downwardly over the edge of the flange 2, from the position indicated by broken lines to that indicated by full lines (Figure 5). The crust is now in position for proper shearing action between the flange 2 and the lip 4.

The wedge shaped groove defined by the wall 8 and the lip 4 performs other functions in addition to maintaining the flange 2 in contact with the lip 4. Thus, at some points about the edge of the pie, the crust may not overhang sufficiently to be engaged by the disc 45 as just explained. In this case the inclined wall 8 merely forces the excess crust tightly against the edge of the flange 2, since such excess is slight. This serves to insure a neat appearance to the finished pie. The inclination of the wall 8 also serves to pinch the upper and lower crust together about the edge of the pie in an obvious manner, serving to seal the pie against leakage around the edge.

Means for removing any trimming or other dough that may adhere to the under side of the lip 4 is shown in Figure 6. This comprises a resilient scraper blade 54 fixed beneath the cutting member 6 to the frame 17 and directed upwardly so that the free end 55 of the blade contacts the bottom of the lip 4 near its periphery. Any of the dough adhering to the underside of the lip 4 will be removed by the scraper 54 as the member 6 rotates, in an obvious manner. A suitable receptacle 56 may be provided beneath the cutting member 6 to receive the excess crust dough trimmed from the pies, an apron 57 being provided to prevent such trimmings getting into the transmission 20 or other parts of the machine.

I claim:

1. In apparatus for trimming circular objects, each of said objects being carried by a member having an annular projecting flange and in which portions of the objects extend beyond the flanges of their respective carrying members, a cutter member and a guide member relatively movable with respect to each other, each of said members having a projecting lip, said lips cooperating with said flanges to support the carrying members, the lip on the cutter member also serving to perform the trimming operation on said extended portions of the objects, and means whereby said members resiliently confine the object between them, so that relative movement of the cutter member and the guide member advances the object.

2. In apparatus for trimming an object carried by a member having an annular projecting flange, and in which portions of said object extend beyond the flange, a cutter member having a projecting lip for engaging under said flange to support said carrying member, and means for moving said lip with respect to said flange to perform a cutting operation on said extended portions of the object.

3. In apparatus for trimming an object carried by a member having an annular projecting flange, a cutter member having a projecting lip as well as an overhanging wall extending upwardly from the lip, said lip being adapted to engage under said flange, and means for imparting a transverse and translatory motion to said flange with respect to the lip for performing a cutting operation about the edge of the flange, said wall serving to restrict transverse movement of the flange on said lip as well as to maintain it on said lip.

4. In pie trimming apparatus, a cutter member having a lip for engaging under the flange of a pie pan, and performing the trimming operation, and means for advancing the pie pan with respect to said lip.

5. In apparatus for trimming a pie carried in a pie pan having an annular flange, a movable cutter member having a lip adapted for engaging the under surface of the flange of the pie pan, as well as a surface for engaging the edge of said flange, a guide member also having a lip and a surface respectively engageable with said flange and the edge of said flange, means resiliently urging said members relatively toward each other whereby the pie pan is confined between said surfaces and supported on said lips, movement of the cutter member causing the pie pan to advance between said members, said cutter member trimming the pie as it advances.

6. In apparatus for trimming a pie carried in a pie pan having an annular flange, a pair of relatively movable members, each member having a lip adapted for supporting said pie pan by engagement under the flange of the pan, as well as means forming a surface adapted for engaging the edge of said flange, means for urging said members relatively toward each other to confine said pan between said surfaces, whereby relative movement of the members causes the pie pan to advance in a planetary manner between the surfaces, the lip on one of said members cooperating with said flange to perform a trimming operation on the pie.

7. In apparatus for trimming a pie carried in a pie pan having an annular flange, a movable member having a projecting lip and an overhanging wall, a stationary guide member facing said movable member and having a projecting lip aligned with the lip on the movable member as well as a wall, said lips being adapted to support said pie pan by its flange between the members, and means resiliently urging said members relatively towards each other, whereby the pie pan is confined between said walls and caused to advance in response to movement of the movable member.

8. In pie trimming apparatus, a rotatable circular cutter, means rotating said cutter, means cooperating with the cutter to form an arcuate path along which a pie is adapted to pass, said means acting to confine the pie between the means and the cutter, whereby rotation of the cutter advances the pie along said path, the rolling movement of the pie on the cutter in its advance along the path causing the trimming operation.

9. In apparatus for trimming a pie in a flanged pie pan, a movable cutter including a lip adapted to engage said flange for supporting the pie pan and means cooperating with said lip forming a wedge shaped groove, and means for forcing the flange of the pie pan into said groove whereby pressure is exerted on the edge of the flange.

10. In apparatus for trimming a pie carried in a pie pan having an annular flange, means forming a pair of relatively movable wall surfaces adapted to engage the edges of said flange at diametrically opposite points, whereby relative movement of said surfaces causes said pan to roll along said surfaces, a lip connected with each surface for engaging said flange and supporting the pan, the rolling movement of the pan causing said flange and at least one of said lips to have a scissors like action for trimming dough from the edge of the flange.

11. In apparatus for trimming a pie carried in a pie pan having an annular flange, a lip for supporting said flange, and means causing relative movement of said flange on said lip for performing a trimming operation on the pie.

12. In apparatus for trimming a pie carried in a pie pan having an annular flange, the pie crust dough having a portion extending beyond the edge of the flange, a lip for supporting said flange, said lip and said flange by relative movement operating to remove said portion of dough, and means for urging said portion of dough into position for engagement by said lip and said flange.

13. In apparatus for trimming a pie carried in a pie pan having an annular flange, the pie crust dough having a portion extending beyond the edge of the flange, a lip for supporting said flange, said lip and said flange by relative movement operating to remove said portion of dough, and means for urging said portion of dough into position for engagement by said lip and said flange, said means comprising a rotating disc closely spaced below said lip and extending beyond the edge of the lip.

14. In apparatus for trimming the edge of an object carried by a member having a substantially circular periphery, a portion of said object extending beyond said periphery, a movable cutter member, means moving said cutter in a cutting direction, a guide member, said cutter member and said guide member being supported for relative movement toward and away from each other, means resiliently urging said members to confine the carrying member between them, and means whereby said cutter supports the adjacent portion of the periphery of the carrying member and causes said member to present progressively the extended portion of the object to be trimmed.

15. In apparatus for trimming the edge of an object carried by a member having a substantially circular periphery, a portion of said object extending beyond said periphery, a cutter member and a guide member relatively movable with respect to each other, and means moving one of said relatively movable members, said members cooperating to support said carrying member, the relative movement between said movable members advancing said carrying member and performing the trimming operation on the extended portion of said object.

FRANK BRYANT.